(12) United States Patent
Penner et al.

(10) Patent No.: US 10,184,550 B2
(45) Date of Patent: Jan. 22, 2019

(54) PLATE LINK CHAIN

(71) Applicant: Schaeffler Technologies AG & Co. KG, Herzogenaurach (DE)

(72) Inventors: Stephan Penner, Bühl (DE); Jürgen Ochs, Bühl (DE); Konstantin Braun, Rastatt (DE)

(73) Assignee: Schaeffler Technologies AG & Co. KG, Herzogenaurch (DE)

( * ) Notice: Subject to any disclaimer, the term of this patent is extended or adjusted under 35 U.S.C. 154(b) by 11 days.

(21) Appl. No.: 15/120,517

(22) PCT Filed: Jan. 23, 2015

(86) PCT No.: PCT/DE2015/200022
§ 371 (c)(1),
(2) Date: Aug. 20, 2016

(87) PCT Pub. No.: WO2015/124151
PCT Pub. Date: Aug. 27, 2015

(65) Prior Publication Data
US 2017/0009852 A1 Jan. 12, 2017

(30) Foreign Application Priority Data
Feb. 24, 2014 (DE) .................... 10 2014 203 203

(51) Int. Cl.
| | |
|---|---|
| *F16G 1/21* | (2006.01) |
| *F16G 1/22* | (2006.01) |
| *F16G 5/16* | (2006.01) |
| *F16H 9/24* | (2006.01) |
| *F16G 5/18* | (2006.01) |
| *F16G 13/06* | (2006.01) |

(52) U.S. Cl.
CPC ............. *F16H 9/24* (2013.01); *F16G 5/18* (2013.01); *F16G 13/06* (2013.01)

(58) Field of Classification Search
CPC . F16G 5/18; F16G 13/04; F16G 13/02; F16H 9/24; F16H 9/125
USPC .................................................. 474/240, 241
See application file for complete search history.

(56) References Cited

U.S. PATENT DOCUMENTS

| | | | | |
|---|---|---|---|---|
| 3,049,933 A | * | 8/1962 | Besel | ......................... F16G 5/18 |
| | | | | 474/201 |
| 3,916,709 A | * | 11/1975 | Steuer | ....................... F16G 5/18 |
| | | | | 474/201 |

(Continued)

FOREIGN PATENT DOCUMENTS

| | | |
|---|---|---|
| CN | 1666038 A | 9/2005 |
| DE | 19743676 A1 | 4/1998 |

(Continued)

OTHER PUBLICATIONS

Chinese Office Action for CN201580009938.2; 6 pgs; dated Nov. 27, 2017 by Chinese Patent Office.

*Primary Examiner* — Henry Y Liu
(74) *Attorney, Agent, or Firm* — Lekeisha M. Suggs

(57) ABSTRACT

A plate link chain for a continuously variable transmission in a motor vehicle. The chain includes longer and shorter chain links that include longer and shorter link plates that are coupled to each other by pairs of rocker pressure pieces. The plate link chain includes only two types of link plates, namely shorter link plates and longer link plates.

10 Claims, 2 Drawing Sheets

(56) References Cited

U.S. PATENT DOCUMENTS

| | | | | |
|---|---|---|---|---|
| 4,344,761 | A * | 8/1982 | Steuer | F16G 5/18 474/167 |
| 4,505,693 | A * | 3/1985 | Moss | F16G 13/06 474/240 |
| 4,642,079 | A * | 2/1987 | Horowitz | F16G 5/18 474/206 |
| 4,650,445 | A * | 3/1987 | Mott | F16G 5/18 474/201 |
| 4,764,158 | A * | 8/1988 | Honda | F16G 5/18 474/212 |
| 4,993,999 | A * | 2/1991 | Mott | F16G 5/18 474/240 |
| 5,090,947 | A * | 2/1992 | van Rooij | F16G 5/18 474/240 |
| 5,131,892 | A * | 7/1992 | Mott | F16G 5/18 474/240 |
| 5,393,272 | A * | 2/1995 | Okuwaki | F16G 5/18 474/213 |
| 5,645,502 | A * | 7/1997 | Wakabayashi | F16G 5/18 474/245 |
| 5,728,021 | A * | 3/1998 | van Rooij | F16G 5/18 474/229 |
| 6,432,011 | B1 * | 8/2002 | Kanehira | F16G 13/04 474/213 |
| 6,478,704 | B1 * | 11/2002 | Greiter | F16G 5/18 474/215 |
| 6,558,281 | B1 | 5/2003 | Greiter | |
| 6,695,731 | B2 | 2/2004 | Linnenbruegger et al. | |
| 8,038,560 | B2 * | 10/2011 | Lou | F16G 5/18 474/212 |
| 2001/0046917 | A1 | 11/2001 | Linnenbrugger et al. | |
| 2007/0042849 | A1 * | 2/2007 | Tada | F16G 5/18 474/206 |
| 2007/0082517 | A1 * | 4/2007 | Lou | F16G 5/18 439/79 |
| 2007/0129195 | A1 * | 6/2007 | Kuster | F16G 5/18 474/245 |
| 2007/0142151 | A1 * | 6/2007 | Vornehm | F16G 5/18 474/215 |
| 2008/0051235 | A1 * | 2/2008 | Tada | F16G 5/18 474/8 |
| 2008/0234081 | A1 * | 9/2008 | Kamamoto | B21L 15/00 474/109 |
| 2008/0254927 | A1 * | 10/2008 | Yasuhara | F16G 5/18 474/201 |
| 2009/0029817 | A1 * | 1/2009 | Kamamoto | F16G 5/18 474/248 |
| 2009/0105025 | A1 * | 4/2009 | Kamamoto | F16G 5/18 474/156 |
| 2009/0105026 | A1 * | 4/2009 | Kamamoto | F16G 5/18 474/245 |
| 2009/0118042 | A1 * | 5/2009 | Rothenbuhler | F16G 5/18 474/8 |
| 2009/0190693 | A1 * | 7/2009 | Moriya | G10L 19/008 375/299 |
| 2009/0192001 | A1 | 7/2009 | Linnenbrugger et al. | |
| 2010/0203988 | A1 * | 8/2010 | Kamamoto | F16G 5/18 474/8 |
| 2010/0279805 | A1 * | 11/2010 | Kamamoto | F16G 5/18 474/148 |

FOREIGN PATENT DOCUMENTS

| | | |
|---|---|---|
| DE | 19951949 A1 | 5/2000 |
| DE | 10036258 A1 | 3/2001 |
| DE | 10047979 A1 | 4/2001 |
| DE | 10118102 A1 | 10/2001 |
| EP | 2192325 A1 | 6/2010 |

* cited by examiner

PLATE LINK CHAIN

BACKGROUND OF THE INVENTION

Field of the Invention

The present invention relates to a plate link chain, in particular for a continuously variable transmission in a motor vehicle. The chain has longer and shorter chain links which include longer and shorter link plates that are coupled to each other by pairs of rocker pressure pieces. In addition, the present invention relates to a CVT transmission having such a plate link chain. The letters CVT stand for continuously variable transmission, and mean that the CVT transmission is variable by stepless adjustments.

Description of the Related Art

From the German published application DE 100 36 258 A1 a plate link chain for a continuously variable transmission of a motor vehicle is known. The chain is made up of individual chain links that are connected to one another by articulated devices. Each of the chain links has a plurality of link plates situated essentially parallel to each other, at least part of the chain links having different link plates, with at least one first type of link plate and at least one second type of link plate.

From German published application DE 199 51 949 A1 a plate link chain is known having a plurality of link plates which are connected with one another flexibly by means of pressure pieces, the pressure pieces running transversely to the longitudinal direction of the chain. A deflection of the plate link chain in at least one direction transverse to its running direction to damp pressure vibrations is subject to resistance.

From German published application DE 101 18 102 A1 a plate link chain is known having at least one swivel guard, which ensures that the swivel angle between chain links having different pitches is smaller than 27 degrees.

From German published application DE 197 43 676 A1 it is known additionally to use link plates which have two openings that are separated from each other by means of a central crosspiece.

An object of the present invention is to further improve a plate link chain, in particular with regard to its service life and/or unwanted noise development during operation.

SUMMARY OF THE INVENTION

The object is fulfilled in the case of a plate link chain, in particular for a continuously variable transmission in a motor vehicle, the chain having longer and shorter chain links which include longer and shorter link plates that are coupled to each other by pairs of rocker pressure pieces, in that the plate link chain has only two types of link plates, namely shorter link plates and longer link plates. The plate link chain preferably includes a large number of link plates, which are arranged side-by-side in rows transversely to a chain running direction. The construction and function of such a plate link chain are disclosed, for example, in the previously named German published applications. According to an essential aspect of the present invention, only two different types of link plates are needed. That greatly simplifies the production of the plate link chain according to the present invention.

A preferred exemplary embodiment of the plate link chain is characterized in that the end straps of the link plates are wide enough so that the link plates constantly partially overlap in the longitudinal direction of the plate link chain when the chain is in operation. The extension of the link plate end straps in the longitudinal direction of the chain is referred to as their width. The link plate end straps of the plate link chain according to the present invention are sufficiently wide to ensure overlapping of the laterally adjacent link plate end straps in every condition.

Another preferred embodiment of the plate link chain is characterized in that the width of the side straps of the link plates is greater than one thickness of a rocker pressure piece. The extension of the rocker pressure pieces in the longitudinal direction of the chain is referred to as the rocker pressure piece thickness.

Another preferred exemplary embodiment of the plate link chain is characterized in that the width of the link plate end straps is smaller than a difference of half a pitch of the longer link plates, less one rocker pressure piece thickness. The distance between two pairs of rocker pressure pieces in the longitudinal direction of the chain is referred to as the pitch of the link plates, with the two pairs of rocker pressure pieces being assigned to one link plate.

Another preferred exemplary embodiment of the plate link chain is characterized in that the width of the link plate end straps is greater than a difference of half a pitch of the shorter link plates, less one rocker pressure piece thickness. The rocker pressure piece pairs are advantageously all designed the same.

Another preferred exemplary embodiment of the plate link chain is characterized in that the minimum width of the link plate end straps is ninety-five percent of a difference of half a pitch of the longer link plates, minus the rocker pressure piece thickness. That value has proven to be especially advantageous in investigations carried out within the framework of the present invention.

Another preferred exemplary embodiment of the plate link chain is characterized in that guideways for the rocker pieces in the link plates are adjusted so that unwanted buckling of the plate link chain toward the inside and toward the outside is reliably prevented. The guideways are created by the geometric dimensions of the openings for the pairs of rocker pressure pieces.

Another preferred exemplary embodiment of the plate link chain is characterized in that all the shorter link plates of the plate link chain are designed the same. That makes it possible to significantly reduce the production costs of the plate link chain according to the invention.

Another preferred exemplary embodiment of the plate link chain is characterized in that all the longer link plates of the plate link chain are designed the same. That makes it possible to further reduce the production costs of the plate link chain according to the invention.

Another preferred exemplary embodiment of the plate link chain is characterized in that the middle crosspiece in the center of the link plate in the longitudinal direction of the chain has approximately the same extent as the two openings in the longer link plate. That has proven to be advantageous with regard to the strength and the distribution of mass.

In addition, the present invention relates to a shorter link plate and/or a longer link plate for a plate link chain described above. The link plates are marketable separately.

In addition, the present invention relates to a CVT transmission having a plate link chain described above. In the CVT transmission, the plate link chain serves to connect two sets of conical disks with each other as a drive.

BRIEF DESCRIPTION OF THE DRAWINGS

Additional advantages, features, and details of the present invention can be seen from the following description, in which various exemplary embodiments are described in detail with reference to the drawings. The drawing figures show the following.

DESCRIPTION OF THE PREFERRED EMBODIMENTS

Figure 1:
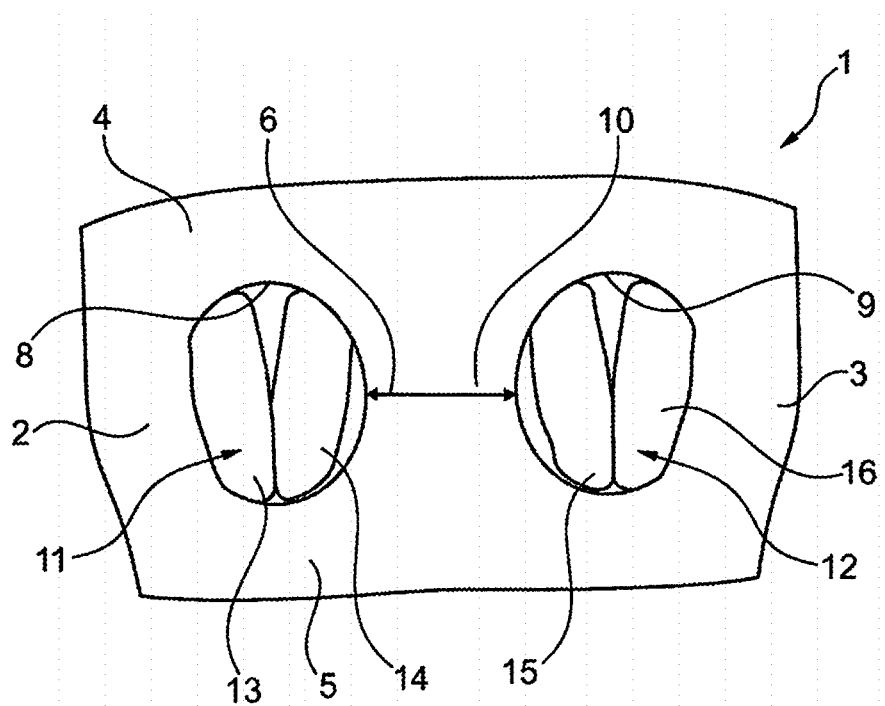
FIG. 1 shows a longer link plate of a plate link chain according to the present invention, in a side view.
Figure 2:
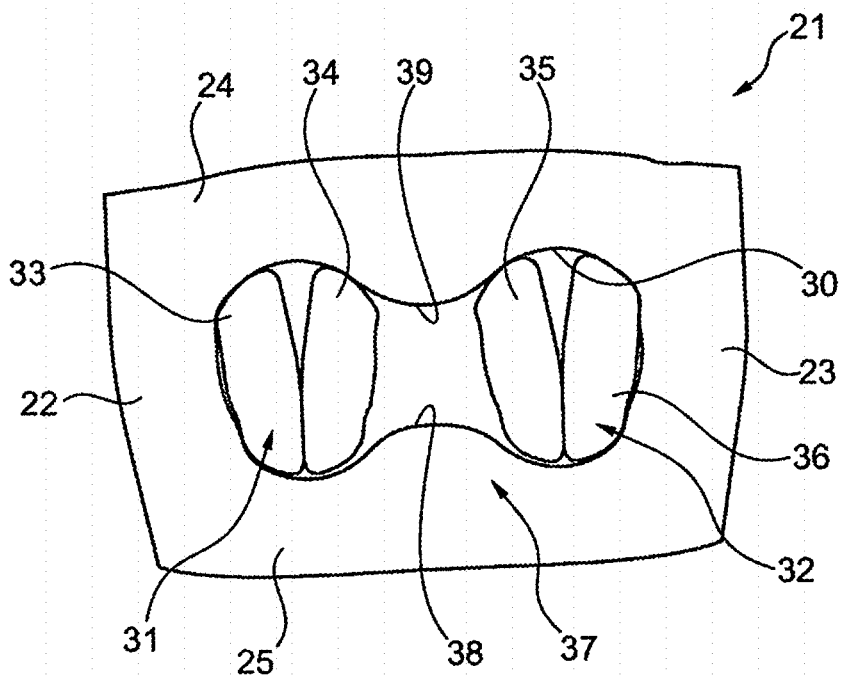
FIG. 2 shows a shorter link plate of the plate link chain according to the invention, also in a side view.

FIGS. 1 and 2 show a longitudinally longer link plate 1 and a longitudinally shorter link plate 21, each in a side view. The longer link plate 1 is also referred to herein as a long link plate. By analogy, the shorter link plate 21 is also referred to herein as a short link plate.

The plate link chain according to the present invention includes only two types of link plates, namely the long link plates 1 shown in FIG. 1 and the short link plates 21 shown in FIG. 2. All long link plates 1 are designed the same. All short link plates 21 are designed the same.

Apart from the use of only two types of link plates, the plate link chain according to the present invention is ultimately designed similarly to the plate link chain described in German published, unexamined application DE 100 47 979 A1. The plate link chain according to the present invention is used in a continuously variable, chain-driven conical-pulley transmission, as also disclosed in the identified published application.

The longer link plate 1 shown in FIG. 1 includes a left link plate end strap 2 and a right link plate end strap 3. The link plate end straps 2 and 3 are connected at the top of the link plate to an upper link plate strap 4. At the bottom of the link plate, the two link plate end straps 2 and 3 are connected to a lower link plate strap 5.

The longer link plate, or long link plate, 1 includes an opening 8 and an opening 9. The two openings 8 and 9 are separated from each other by a middle crosspiece 10. A double headed arrow 6 in FIG. 1 indicates that the middle crosspiece 10 has the same extent in the longitudinal direction of the chain, which corresponds to the horizontal direction in FIGS. 1 and 2, as the longitudinal extent in the longitudinal direction of the chain of opening 8 and the longitudinal extent in the longitudinal direction of the chain of opening 9. The two openings 8 and 9 have the same extent in the longitudinal direction of the chain.

To illustrate (not shown) chain links, rocker pressure piece pairs 11 and 12 are positioned in openings 8 and 9, respectively. The rocker pressure piece pair 11 positioned in opening 8 includes two rocker pressure pieces 13 and 14. The rocker pressure piece pair 12 positioned in opening 9 includes two rocker pressure pieces 15 and 16.

The long link plate 1 is filled in the middle by the middle crosspiece 10. In FEM calculations performed in conjunction with the present invention, in which fabrication-based deviations in geometry and internal stresses were taken into account, the middle region was optimized with the middle crosspiece 10.

The shorter link plate or short link plate 21 shown in FIG. 2 includes a left link plate end strap 22 and a right link plate end strap 23. The two link plate end straps 22 and 23 are connected at the top of the link plate by an upper link plate strap 24. At the bottom, the two link plate end straps 22 and 23 are connected by a lower link plate strap 25.

In contrast to the long link plate 1 shown in FIG. 1, the short link plate 21 shown in FIG. 2 includes only one common opening 30 for receiving two rocker pressure piece pairs 31 and 32. The rocker pressure piece pair 31 includes two rocker pressure pieces 33 and 34. The rocker pressure piece pair 32 includes two rocker pressure pieces 35 and 36.

The opening 30 of the shorter link plate 21 is provided in a middle region 37 with inwardly extending, convexly curved regions 38 and 39. The curved region 38 has essentially the shape of a circular arc, and is formed on the upper link plate strap 24. The curved region 39 has essentially the shape of a circular arc, and is formed on the lower link plate strap 25.

The effect of the convex curves 38 and 39 is that the opening 30 in the middle between the two rocker pressure piece pairs 31 and 32 of the shorter link plate 21 has a smaller extent between the upper and lower link plate straps 24 and 25, i.e., in the vertical direction in FIG. 2, than in the regions of opening 30 where the rocker pressure piece pairs 31 and 32 are accommodated.

By leaving out the middle crosspiece 10 of the longer link plate 1 in the shorter link plates or short link plates 21, the mass of shorter link plate 21 is reduced, relative to the mass of longer link plate 1, and the specific weight over the length of the short link plate 21 is matched to that of the long link plate or longer link plate 1.

Figure 3:
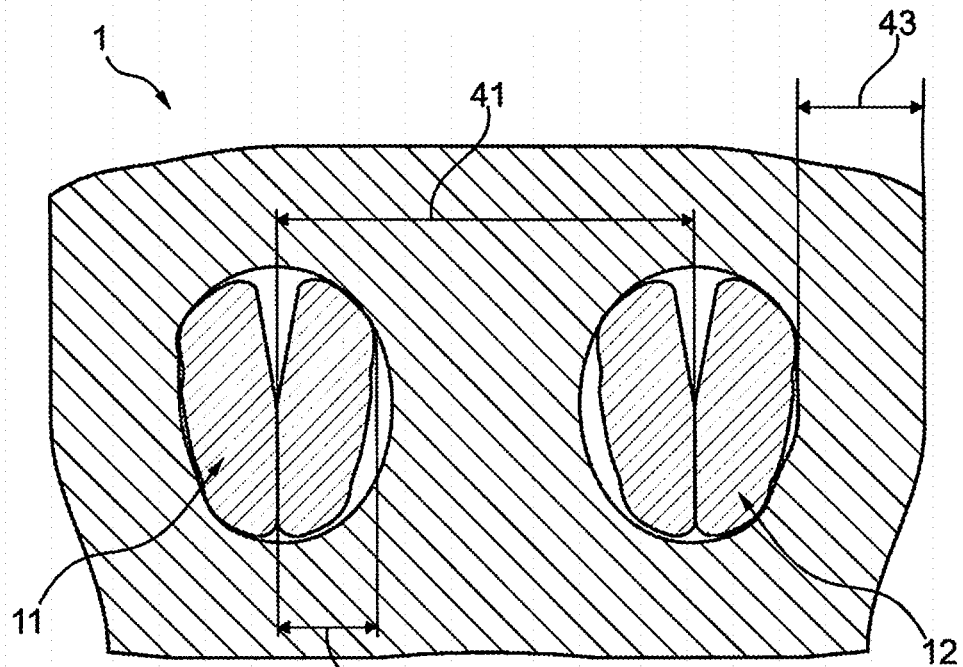
FIG. 3 shows an enlarged side view of the long link plate of FIG. 1, with double headed arrows to identify the physical features of the regions of the link plates.

FIG. 3 shows the long link plate 1 of FIG. 1 in an enlarged side view. A double headed arrow 41 designates the link plate pitch. The link plate pitch represented by double headed arrow 41 corresponds to the spacing between the respective contact points of the two rocker pressure piece pairs 11 and 12. A double headed arrow 42 designates the thickness of the rocker pressure pieces of the rocker pressure piece pair 11.

The extent of the individual rocker pressure pieces in the longitudinal direction of the chain is referred to as the rocker pressure piece thickness. A double headed arrow 43 designates one link plate end strap longitudinal width. The extent of a link plate end strap in the longitudinal direction of the chain is referred to as the link plate end strap width.

In the investigations carried out within the framework of the present invention, various possibilities were considered for how the pitch of a chain link of a plate link chain can be reduced.

One possibility involves, for example, removing material from the middle of the link plate, and thus reducing the spacing between the rocker pairs of the plate link chain. If the thicknesses of the rocker pressure pieces remains unchanged, then the cross sectional areas of the link plate end straps must be reduced by the same amount resulting from the material removal, since the space between the rocker pairs becomes smaller.

Another possibility involves reducing the rocker pressure piece thicknesses, and removing the length that is saved thereby in the middle region of a link plate. In that way, the space between the two rocker pairs remains approximately the same, and the link plate end straps can preferably remain approximately the same, including the chain links positioned before and after them. The two possibilities described above can also be combined with each other.

If the smaller pitch is achieved largely by reducing the rocker pressure piece widths, and if a large enough link plate end strap width is chosen in proportion to the rocker pressure piece thickness, then it is possible to get by with just two types of link plates. The link plate end straps are thus sufficiently wide to ensure that they overlap in the longitudinal direction of the chain in every condition.

Buckling of the plate link chain toward the outside and inside is prevented by the adjusted guiding of the rocker pressure pieces in the link plates. The minimum width of the link plate end straps is preferably ninety-five percent of a difference of half a long link plate pitch minus the rocker pressure piece thickness.

Figure 4:
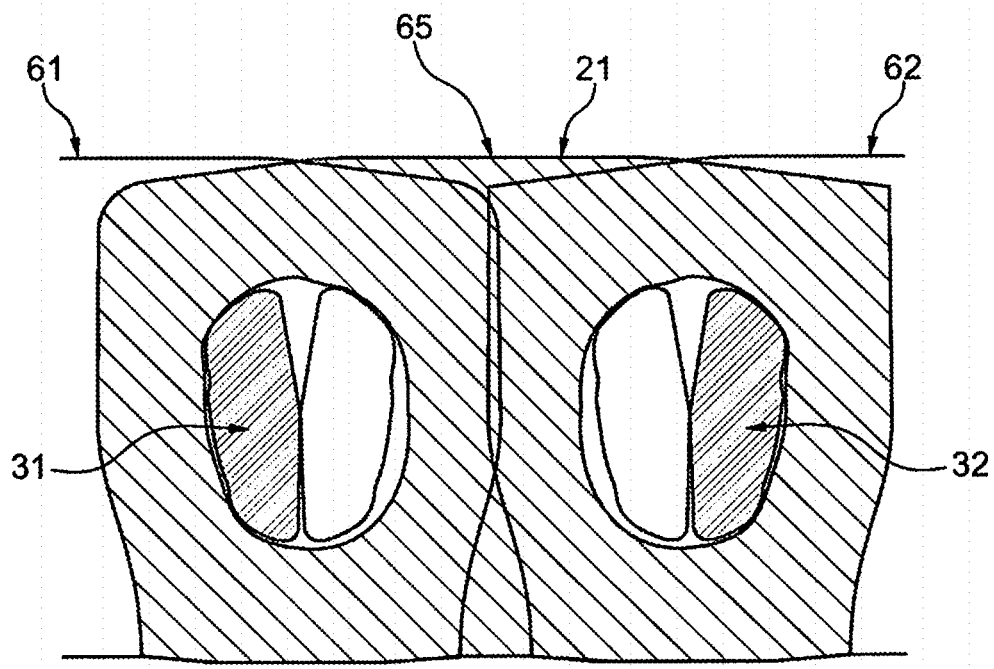
FIG. 4 shows a transverse, cross-sectional view of a link of a plate link chain according to the present invention, the link having two long link plates and one short link plate.

FIG. 4 shows a portion of a plate link chain according to the present invention having one short link plate 21 and two long link plates 61, 62. The short link plate 21 corresponds to the short link plate shown in FIG. 2. The long link plates 61 and 62 correspond to the long link plate 1 shown in FIG. 1. Only half of each of the long link plates 61 and 62 is shown in FIG. 4.

It can be seen in FIG. 4 that the long link plates 61 and 62 overlap each other in the longitudinal direction of the chain in an overlap area where their respective link plate end straps face each other. The link plates 21 and 61, 62 shown in FIG. 4 are offset from each other in a direction perpendicular to the plane of the drawing.

The invention claimed is:

1. A plate link chain for a continuously variable transmission in a motor vehicle, the chain comprising: a plurality of longitudinally longer and longitudinally shorter chain links, relative to a chain longitudinal movement direction, wherein the chain links include longitudinally longer and longitudinally shorter link plates that are coupled to each other by transversely extending, longitudinally spaced pairs of rocker pressure pieces, wherein the plate link chain is composed of only two types of link plates, namely longitudinally shorter link plates and longitudinally longer link plates, wherein each of the longitudinally shorter chain links includes only one common link plate opening for receiving the pairs of rocker pressure pieces, the link plate opening having a middle region between the pairs of rocker pressure pieces with inwardly extending convexly curved regions and having a first height, and wherein the link plate opening has an end region where the pairs of rocker pressure pieces are accommodated that has a second height greater than the first height of the middle region.

2. A plate link chain according to claim 1, wherein the link plates include longitudinally spaced link plate end straps and the end straps have a longitudinal width of such an extent that laterally adjacent link plates constantly overlap partially in a longitudinal direction of the plate link chain when the chain is in operation.

3. A plate link chain according to claim 2, wherein the longitudinal width of the link plate end straps is greater than a thickness in the longitudinal direction of the chain of a rocker pressure piece.

4. A plate link chain according to claim 3, wherein the link plate end strap longitudinal width is smaller than a difference of half a pitch dimension of the longitudinally longer link plates less one rocker pressure piece thickness.

5. A plate link chain according to claim 3, wherein the link plate end strap longitudinal width is greater than a difference of half a pitch dimension of the longitudinally shorter link plates less one rocker pressure piece thickness.

6. A plate link chain according to claim 5, wherein a minimum link plate end strap longitudinal width is about ninety-five percent of a difference of half a pitch dimension of the longitudinally longer link plates minus the rocker pressure piece thickness.

7. A plate link chain according to claim 1, wherein the link plate openings are of a size such that unwanted buckling of the plate link chain in an inner direction of the chain and in an outer direction of the chain is reliably prevented.

8. A plate link chain according to claim 1, wherein all the longitudinally shorter link plates are of equal size and shape and all the longitudinally longer link plates are of equal size and shape.

9. A plate link chain according to claim 7, wherein the longitudinally longer link plates each include a middle crosspiece between individual link plate openings.

10. A CVT transmission having a plate link chain according to claim 1.

* * * * *